(12) United States Patent
Tanimura et al.

(10) Patent No.: US 8,351,141 B2
(45) Date of Patent: Jan. 8, 2013

(54) DRIVE DEVICE

(75) Inventors: Yasutaka Tanimura, Nara (JP);
Yasuhiro Honda, Takatsuki (JP);
Natsuko Shiota, Ibaraki (JP); Yoshihiro Hara, Takatsuki (JP)

(73) Assignee: Konica Minolta Opto, Inc. (JP)

( * ) Notice: Subject to any disclaimer, the term of this patent is extended or adjusted under 35 U.S.C. 154(b) by 196 days.

(21) Appl. No.: 12/863,928

(22) PCT Filed: Jan. 22, 2009

(86) PCT No.: PCT/JP2009/050953
§ 371 (c)(1),
(2), (4) Date: Oct. 8, 2010

(87) PCT Pub. No.: WO2009/093645
PCT Pub. Date: Jul. 30, 2009

(65) Prior Publication Data
US 2011/0032628 A1    Feb. 10, 2011

(30) Foreign Application Priority Data

Jan. 23, 2008 (JP) .................................. 2008-012959

(51) Int. Cl.
*G02B 7/02* (2006.01)
*G02B 15/14* (2006.01)
(52) U.S. Cl. ......... 359/820; 359/694; 359/822; 359/823
(58) Field of Classification Search .......... 359/694–704, 359/811–829
See application file for complete search history.

(56) References Cited

U.S. PATENT DOCUMENTS

2010/0296183 A1* 11/2010 Honda et al. .................. 359/823

FOREIGN PATENT DOCUMENTS

| EP | 1 914 422 | | 4/2008 |
|----|-----------|---|--------|
| JP | 60-135673 | A | 7/1985 |
| JP | 2001-227454 | A | 8/2001 |
| JP | 2003-131106 | A | 5/2003 |
| JP | 2003-136495 | A | 5/2003 |
| JP | 2007-57581 | A | 3/2007 |
| KR | 10-2008-0035602 | A | 4/2008 |
| WO | WO 2007/018086 | A1 | 2/2007 |
| WO | WO 2009/093645 | A1 | 7/2009 |

* cited by examiner

*Primary Examiner* — Mohammed Hasan
(74) *Attorney, Agent, or Firm* — Cantor Colburn LLP

(57) ABSTRACT

A drive device includes a setting unit 12 for setting a control value using a control value-displacement characteristic at a predetermined reference temperature showing a relationship between a control value used to position a movable unit 5 and a displacement of the movable unit 5; a drive unit 20 for supplying drive power corresponding to the control value set by the setting unit 12 to a shape-memory alloy 1 and causing the shape-memory alloy 1 to expand or contract, thereby positioning the movable unit 5; and a correction unit 13 for correcting the control value so as to correct a position shift of the movable unit 5 from a target position resulting from a difference between a control value-displacement characteristic at an ambient temperature and a control value-displacement characteristic at the reference temperature based on the ambient temperature detected by a temperature detection unit 11.

12 Claims, 6 Drawing Sheets

DRIVE DEVICE

RELATED APPLICATIONS

This application is a U.S. National Phase Application under 35 U.S.C. 371 of International Application No. PCT/JP2009/050953, filed with Japanese Patent Office on Jan. 22, 2009, which claims priority to Japanese Patent Application No. 2008-012959, filed Jan. 23, 2008.

FIELD OF TECHNOLOGY

The present invention relates to a drive device for moving a movable unit using a shape-memory alloy.

BACKGROUND ART

In recent years, a technology for positioning a lens unit by moving the lens unit utilizing a shape recovery motion of a shape-memory alloy has been developed for image pickup apparatuses. Patent literature 1 discloses a drive device for detecting a surrounding ambient temperature of a shape-memory alloy and controlling an amount of power applied to the shape-memory alloy during a resistance heating period based on the detected ambient temperature so that the temperature of the shape-memory alloy is constantly kept at a substantially fixed temperature regardless of the ambient temperature.
Patent Literature 1:
  Japanese Unexamined Patent Publication No. S60-135673

DISCLOSURE OF THE INVENTION

However, the technique of patent literature 1 is for executing a control to fix the temperature of the shape-memory alloy, but not for correcting a position shift of the lens unit according to a change in the ambient temperature. Thus, with the technique of patent literature 1, a movable unit holding the lens unit cannot be accurately positioned with respect to a target position if the ambient temperature changes.

An object of the present invention is to provide a drive device capable of positioning a movable unit at a target position even if an ambient temperature changes.

BEST MODES FOR CARRYING OUT THE INVENTION

Figure 1:
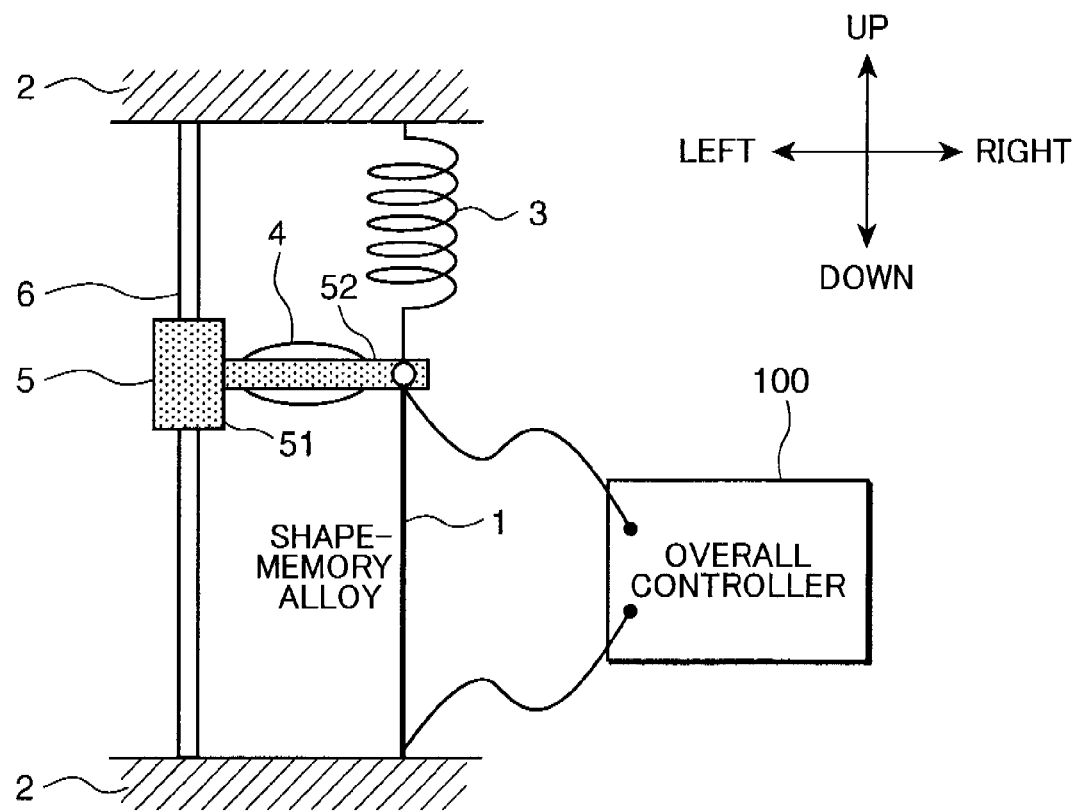
FIG. 1 is an external construction diagram of a drive device according to one embodiment of the invention.

Hereinafter, a drive device according to one embodiment of the present invention is described. In the following description, the drive device is applied to an image pickup apparatus. FIG. 1 is an external construction diagram of the drive device. The drive device includes a shape-memory alloy 1, fixed units 2, a bias spring 3, a lens 4, a movable unit 5, a guide shaft 6 and an overall controller 100. Note that the shape-memory alloy 1, the fixed units 2, the bias spring 3 and the guide shaft 6 form a moving mechanism.

The shape-memory alloy 1 is a wire material extending in a vertical direction and having an upper end connected to a right end of the movable unit 5 and a lower end connected to the lower fixed unit 2. At a temperature beyond a certain temperature, the shape-memory alloy 1 contracts to restore to its memorized shape and moves the movable unit 5 downward by its contraction force. Further, the shape-memory alloy 1 is connected to the overall controller 100 and heated by having drive power supplied from the overall controller 100.

The fixed units 2 include a pair of upper and lower fixed units 2, 2 fixed to a housing of the image pickup apparatus, wherein the upper fixed unit 2 is connected to the guide shaft 6 and the bias spring 3 and the lower fixed unit 2 is connected to the guide shaft 6 and the shape-memory alloy 1. Further, the upper fixed unit 2 is formed with a hole (not shown) for introducing light from an object to the lens 4, and the lower fixed unit 2 is formed with a hole (not shown) for introducing an optical image of the object focused by the lens 4 to an image pickup sensor (not shown).

The bias spring 3 has an upper end connected to the upper fixed unit 2 and a lower end connected to the right end of the movable unit 5 and gives an upward acting stress to the shape-memory alloy 1 to cause the shape-memory alloy 1 to expand upward, thereby moving the movable unit 5 upward. The lens 4 is, for example, composed of a convex lens and focuses and introduces light from an object to the image pickup sensor.

The movable unit 5 includes a movable main portion 51 and a holding portion 52, and moves downward along the guide shaft 6 by the action of a contraction force of the shape-memory alloy 1 and moves upward along the guide shaft 6 by the action of a biasing force of the bias spring 3, thereby moving the lens 4 in the vertical direction.

A long hole extending in the vertical direction penetrates through the movable main portion 51 and the guide shaft 6 is inserted through this long hole. The holding portion 52 is formed to extend rightward substantially from the vertical center of the right surface of the movable main portion 51 and holds the circular lens 4 in such a manner as to surround it. The lower end of the bias spring 3 is connected to the upper side of the right end of the holding portion 52, and the shape-memory alloy 1 is connected to the lower side of the right end.

The guide shaft 6 is made of a bar-like member extending in the vertical direction and having an upper end connected to the upper fixed unit 2 and a lower end connected to the lower fixed unit 2, and guides vertical movements of the movable unit 5.

In the above construction, the bias spring 3 extends when the shape-memory alloy 1 contracts due to an increased modulus of elasticity caused by heating, whereas the shape-memory alloy 1 expands due to a stress of the bias spring 3 to move the movable unit 5 holding the lens 4 when the modulus of elasticity decreases due to heat radiation. The overall controller 100 controls the positioning of the movable unit 5 and also controls the entire image pickup apparatus.

Figure 2:
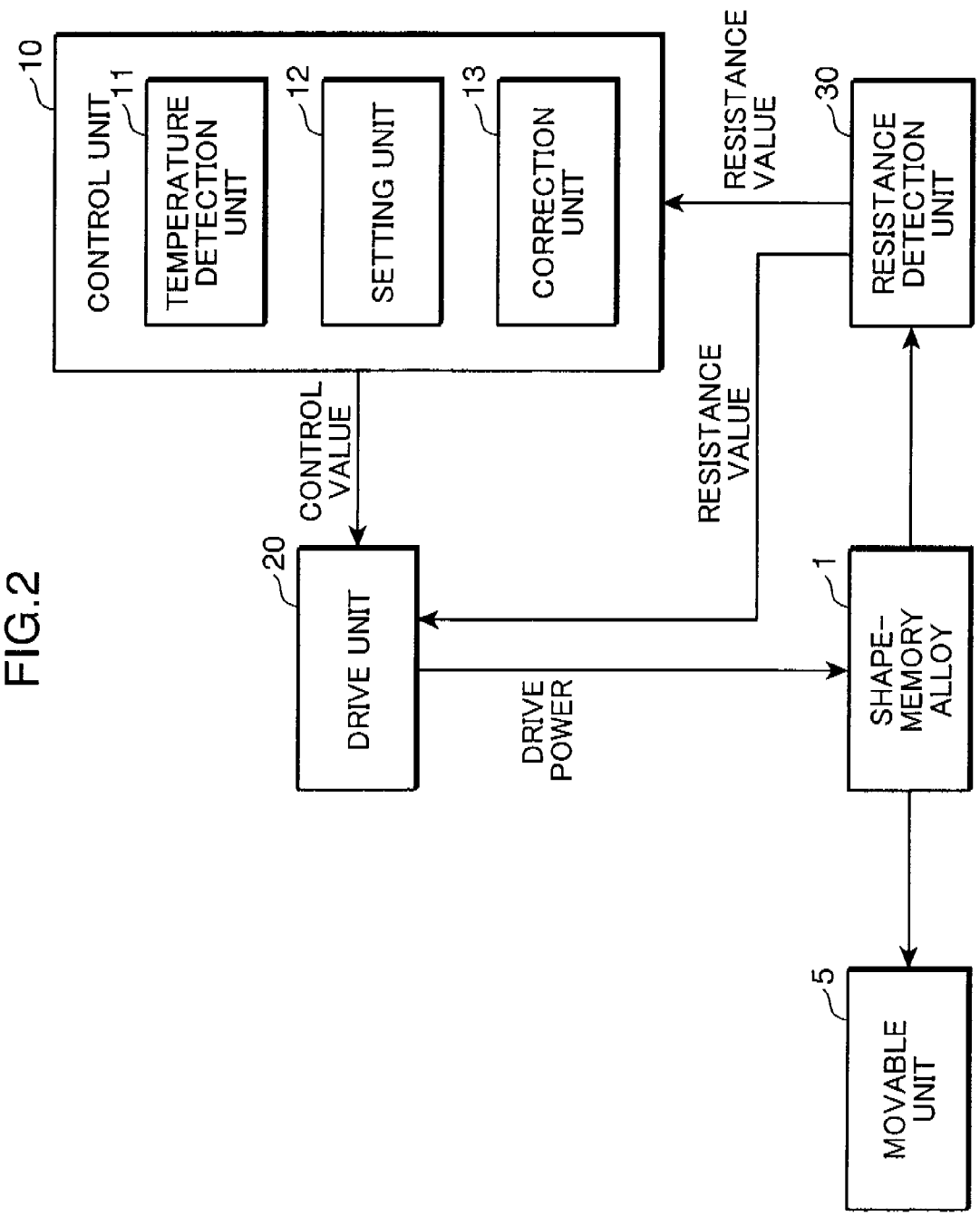
FIG. 2 is a block diagram showing an image pickup apparatus having the drive device according to the embodiment of the invention applied thereto.

FIG. 2 is a block diagram of the overall controller 100. The overall controller 100 includes a control unit 10, a drive unit 20 and a resistance detection unit 30. The control unit 10 is a microcomputer composed of a CPU, a ROM, a RAM, etc. and includes a temperature detection unit 11, a setting unit 12 and a correction unit 13. The temperature detection unit 11 detects a surrounding ambient temperature of the shape-memory alloy 1. In this embodiment, the temperature detection unit 11 detects the ambient temperature based on a resistance value of the shape-memory alloy 1 detected by the resistance detection unit 30. Specifically, the temperature detection unit 11 detects a resistance value when the shape-memory alloy 1 actually starts being displaced and detects the ambient temperature based on a difference between the detected resistance value and a resistance value when the shape-memory alloy 1 starts being displaced at a reference temperature.

Figure 3:
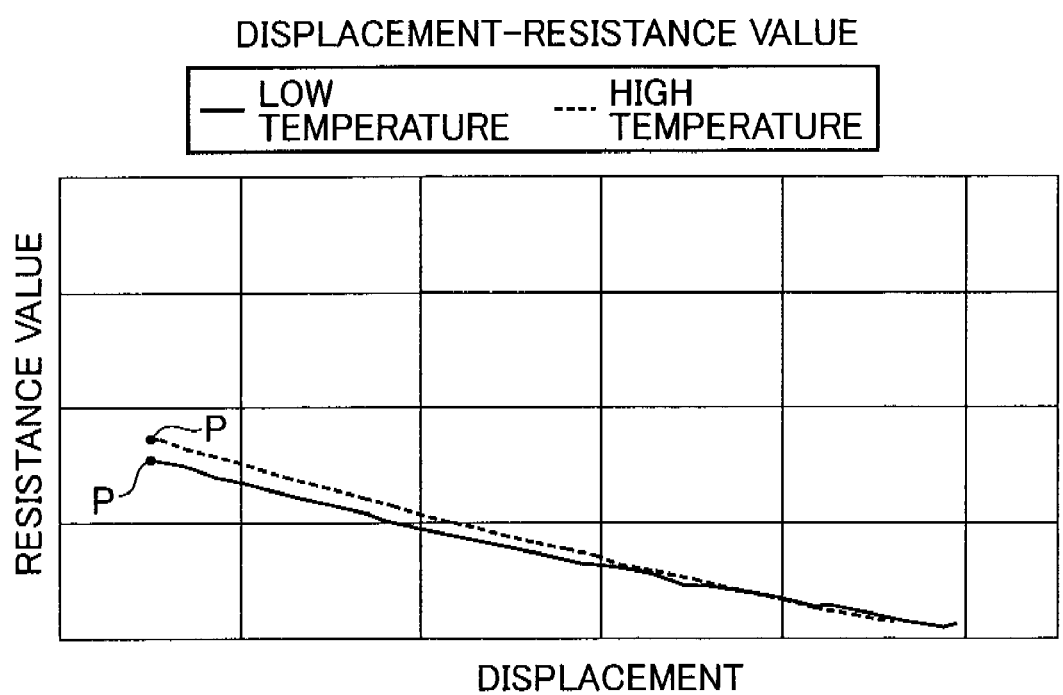
FIG. 3 is a graph showing characteristics of displacement and resistance value of a shape-memory alloy according to the embodiment of the invention.

FIG. 3 is a graph showing characteristics of displacement and resistance value of the shape-memory alloy, wherein solid line shows the characteristic at a low temperature and dotted line shows the characteristic at a high temperature. As shown in FIG. 3, a gradient of the graph at the high temperature is understood to be larger than that of the graph at the low temperature. Further, a resistance value at a point P where the displacement of the shape-memory alloy 1 starts is understood to be higher at the high temperature than at the low temperature.

In other words, the resistance value at the point P depends on temperature. Accordingly, the temperature detection unit 11 can store a relationship between the resistance value and the temperature at the point P beforehand, detect the resistance value at the point P and detect the temperature of the shape-memory alloy 1 as the ambient temperature by specifying a temperature corresponding to the detected resistance value.

Further, it is known that a rate of change in the resistance value of the shape-memory alloy 1 largely changes with respect to drive power before and after the start of the displacement. Accordingly, the temperature detection unit 11 can increase the drive power supplied to the shape-memory alloy 1 at regular intervals, obtain a difference between the resistance values before and after an increase every time the drive power is increased and detect the resistance value when the difference largely changes as the resistance value at the point P.

The above detection of the ambient temperature based on the resistance value is merely an example, and the ambient temperature may be detected by detecting a resistance value of the shape-memory alloy 1 when such small power as not to bring about any displacement is applied or may be detected by a temperature sensor such as a thermistor or a thermocouple disposed near the shape-memory alloy 1.

Referring back to FIG. 2, the setting unit 12 positions the movable unit 5 at a target position by setting a control value used to position the movable unit 5 using a control value-displacement characteristic at a predetermined reference temperature showing a relationship between the control value and the displacement of the movable unit 5. Here, an average temperature under an environment where the use of the image pickup apparatus is assumed is preferably used as the reference temperature.

The correction unit 13 corrects the control value so as to correct a position shift of the movable unit 5 from the target position resulting from a difference between a control value-displacement characteristic at the ambient temperature and the control value-displacement characteristic at the reference temperature based on the ambient temperature detected by the temperature detection unit 11.

Figure 4:
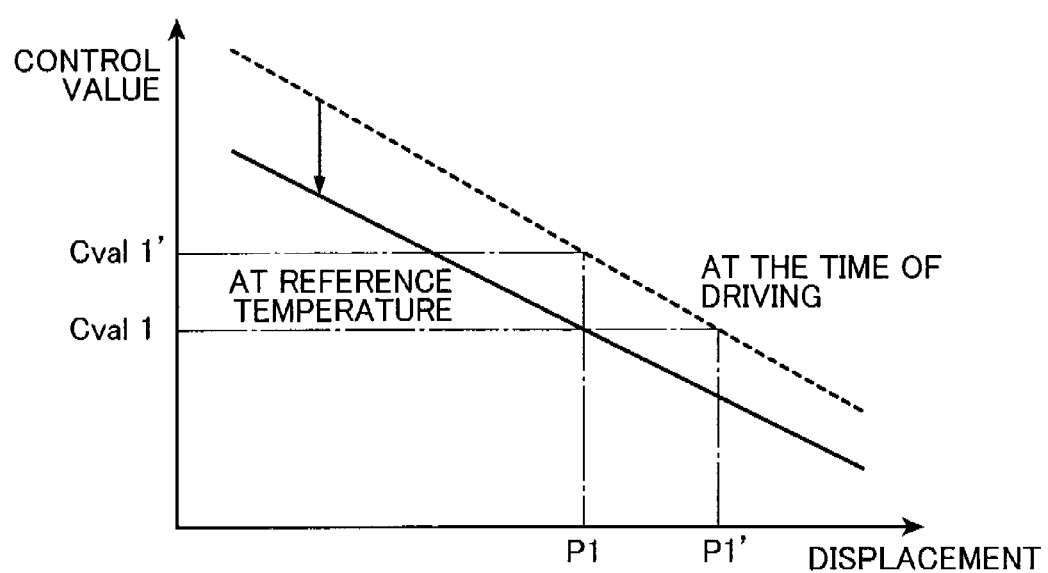
FIG. 4 is a graph showing control value-displacement characteristics of a movable unit according to the embodiment of the invention, wherein solid line shows the control value-displacement characteristic at a reference temperature and dotted line shows the control value-displacement characteristic at the time of driving.

FIG. 4 is a graph showing the control value-displacement characteristics of the movable unit 5, wherein solid line shows the control value-displacement characteristic at the reference temperature and dotted line shows the control value-displacement characteristic at the time of driving. As shown in FIG. 4, it is understood that the control value-displacement characteristic at the time of driving is shifted from that at the reference temperature due to a change of the ambient temperature from the reference temperature.

Such a change in the control value-displacement characteristic is thought to be caused by a change in a linear coefficient of expansion of the moving mechanism or the like with the environment temperature. If the setting unit 12 sets a control value using the control value-displacement characteristic at the reference temperature upon positioning the movable unit 5 at a position P1, Cval1 is set as the control value and the movable unit 5 is positioned at a position P1' instead of at the position P1.

Accordingly, the correction unit 13 corrects the control value such that the control value becomes not Cval1, but Cval1' as a control value at the position P1 in the control value-displacement characteristic at the time of driving. Specifically, the correction unit 13 corrects the control value by an operation shown by Equation (1) using a product of a difference between the ambient temperature at the time of driving and the reference temperature and a predetermined temperature coefficient.

$$Cval' = Cval + \alpha \cdot \Delta T \quad (1)$$

In this Equation, Cval' is a control value after correction, Cval is a control value before correction, $\alpha$ is a predetermined first temperature coefficient and $\Delta T$ is a difference between the reference temperature and the ambient temperature.

In this way, the correction unit 13 can correct the control value so as to correct the position shift of the movable unit 5 from the target position resulting from a difference in an offset component between the control value-displacement characteristic at the ambient temperature and that at the reference temperature.

Here, a value empirically calculated beforehand based on a relationship of the ambient temperature and the linear coefficient of expansion of the moving mechanism is preferably used as the first temperature coefficient $\alpha$.

The correction unit 13 may correct the control value by an operation shown by Equation (2).

$$Cval' = Cval \cdot \beta \cdot \Delta T \quad (2)$$

In this Equation, $\beta$ is a predetermined second temperature coefficient.

In this way, the correction unit 13 can correct the control value so as to correct the position shift of the movable unit 5 from the target position resulting from the difference in an inclination component between the control value-displacement characteristic at the ambient temperature and that at the reference temperature.

Here, a value empirically calculated beforehand based on the relationship of the ambient temperature and the linear coefficient of expansion of the moving mechanism similar to the first temperature coefficient $\alpha$ is preferably used as the second temperature coefficient $\beta$.

The correction unit 13 may correct the control value by an operation shown by Equation (3).

$$Cval' = Cval \cdot \beta \cdot \Delta T + \alpha \cdot \Delta T \quad (3)$$

In this way, the correction unit 13 can correct the control value so as to correct the position shift of the movable unit 5 from the target position resulting from the differences in the offset component and the inclination component between the control value-displacement characteristic at the ambient temperature and that at the reference temperature is corrected.

Referring back to FIG. 2, the drive unit 20 supplies the drive power corresponding to the control value set by the setting unit 12 and causes the shape-memory alloy 1 to expand or contract, thereby positioning the movable unit 5. Specifically, the drive unit 20 specifies a control value corresponding to the resistance value of the shape-memory alloy 1 detected by the resistance detection unit 30 and adjusts the drive power such that the specified control value becomes the control value set by the setting unit 12. Note that the displacement of the shape-memory alloy 1 can be specified by detecting the resistance value of the shape-memory alloy 1 since the resistance value of the shape-memory alloy 1 changes according to the displacement.

The drive unit 20 may supply the drive power to the shape-memory alloy 1 in the form of a voltage, a current or a PWM signal. Here, in the case of a voltage, the drive unit 20 may adjust the voltage to be output to the shape-memory alloy 1 so that the resistance value of the shape-memory alloy 1 becomes the resistance value set by the setting unit 12. In the case of a current, the drive unit 20 may adjust the current to be output to the shape-memory alloy 1 so that the resistance value of the shape-memory alloy 1 becomes the resistance value set by the setting unit 12. Further, in the case of a PWM signal, the drive unit 20 may adjust a duty ratio of the PWM signal to be output to the shape-memory alloy 1 so that the resistance value of the shape-memory alloy 1 becomes the resistance value set by the setting unit 12.

The resistance detection unit 30 is, for example, composed of a wheatstone bridge connected to one end of the shape-memory alloy 1, and calculates the resistance value of the shape-memory alloy 1 by detecting values of the current and voltage flowing in the shape-memory alloy 1. Here, if the shape-memory alloy 1 is constant-current-controlled, the voltage value of the shape-memory alloy 1 may be detected as the resistance value. Note that the other end of the shape-memory alloy 1 is grounded.

Next, the operation of this drive device is described. First of all, the setting unit 12 sets the control value (Cval) for the target position using the control value-displacement characteristic at the reference temperature. Subsequently, the correction unit 13 corrects the control value (Cval) by substituting the ambient temperature detected by the temperature detection unit 11 and the control value (Cval) set by the setting unit 12 into any one of Equations (1) to (3), thereby calculating the control value (Cval'). Subsequently, the setting unit 12 outputs the control value (Cval') calculated by the correction unit 13 to the drive unit 20.

Subsequently, the drive unit 20 adjusts the drive power to bring the shape-memory alloy 1 to the target position until the resistance value of the shape-memory alloy 1 detected by the resistance detection unit 30 becomes a resistance value corresponding to the control value (Cval'). In this way, the movable unit 5 is positioned at the target position.

Here, the control value-displacement characteristic used by the setting unit 12 is a control value-displacement characteristic common to apparatuses obtained in a design phase. In other words, the common control value-displacement characteristic is used for all products to which this drive device is applied.

On the other hand, since the linear coefficient of expansion and the like of the moving mechanism have individual variations, the control value-displacement characteristic also has an individual variation. Thus, if the setting unit 12 sets the control value using the control value-displacement characteristic common to apparatuses, the movable unit 5 cannot be positioned at the target position due to a difference between an own control value-displacement characteristic and the control value-displacement characteristic common to apparatuses.

Accordingly, an empirically obtained value capable of correcting the position shift of the movable unit 5 from the target position resulting from the difference between the control value-displacement characteristic common to apparatuses and the own control value-displacement characteristic is preferably used as the first temperature coefficient $\alpha$.

Figure 5:
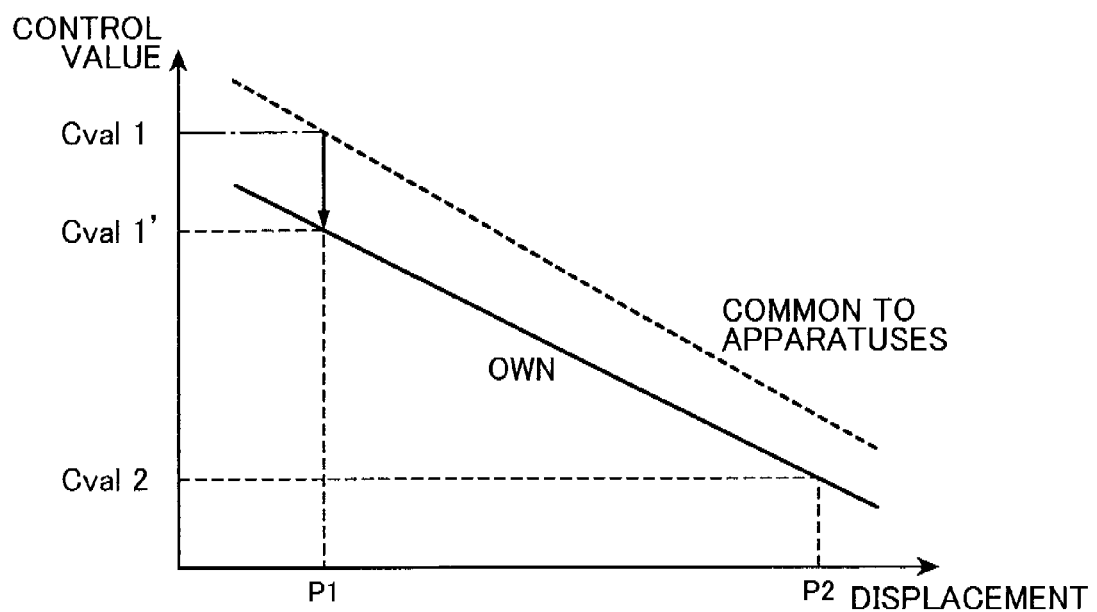
FIG. 5 is a graph showing a control value-displacement characteristic common to apparatuses and an own control value-displacement characteristic at the reference temperature according to the embodiment of the invention.
Figure 6:
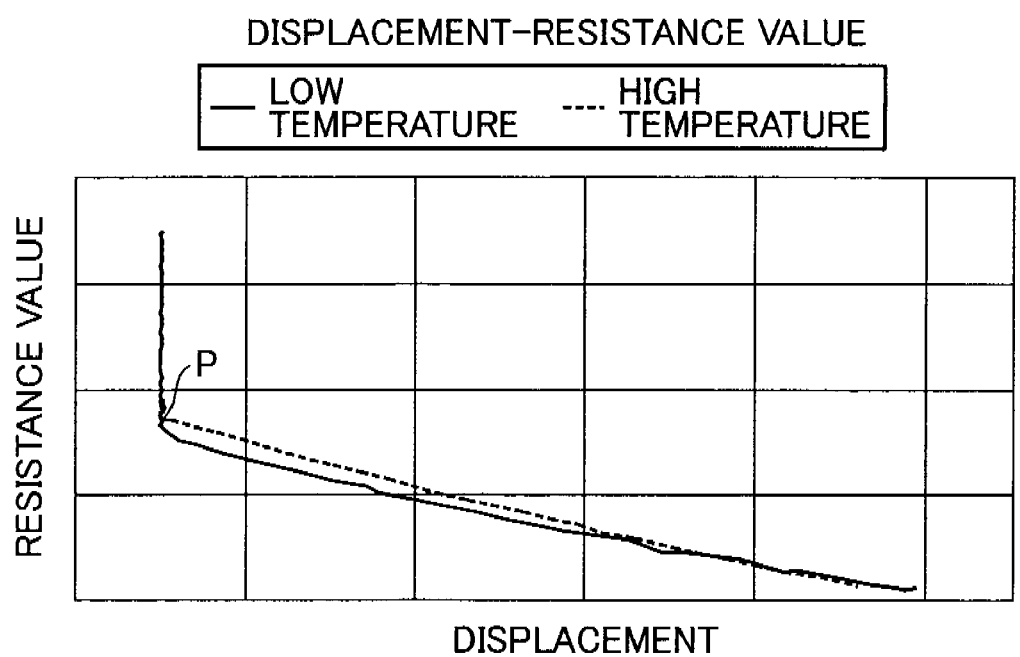
FIG. 6 is a graph showing characteristics of displacement and resistance value of the shape-memory alloy when a stopper is disposed.

FIG. 5 is a graph showing the control value-displacement characteristic common to apparatuses and the own control value-displacement characteristic at the reference temperature, wherein dotted line shows the control value-displacement characteristic common to apparatuses and solid line shows the own control value-displacement characteristic. As shown in FIG. 5, it is understood that the control value-displacement characteristic common to apparatuses and the own control value-displacement characteristic are shifted from each other.

Accordingly, a control value corresponding to a predetermined first position P1 and a control value corresponding to a predetermined second position P2 are measured at the reference temperature and an own control value-displacement characteristic is calculated by connecting the obtained two points by a straight line for each drive device, for example, before shipment from a factory. Here, the own control value-displacement characteristic may be calculated by connecting points other than P1, P2 by a straight line.

Then, a difference in at least one of an offset component and an inclination component between the control value-displacement characteristic common to apparatuses and the own control value-displacement characteristic may be calculated and the first temperature coefficient $\alpha$ and the second temperature coefficient $\beta$ capable of correcting the control value so as to correct a position shift caused by this difference may be calculated.

For example, if the setting unit 12 sets the control value at Cval1 in order to position the movable unit 5 at the first position P1 in FIG. 5, the first temperature coefficient $\alpha$ may be so calculated as to correct Cval1 to Cval1' as the control value corresponding to the first position P1 in the own control value-displacement characteristic.

In the case of disposing a stopper above the movable unit 5 shown in FIG. 1, a displacement-resistance characteristic of the shape-memory alloy 1 changes along an L-shaped curve and there is a region where the resistance value changes with the displacement fixed. This is because the movement of the movable unit 5 is prevented by the stopper even if the resistance value of the shape-memory alloy 1 is increased to move the movable unit 5 further upward with the movable unit 5 held in contact with the stopper. In this case, the temperature detection unit 11 may detect an inflection point P where the shape-memory alloy 1 starts being displaced and the ambient temperature may be calculated based on this inflection point P and an inflection point P at the reference temperature.

As described above, according to this drive device, the control value is so corrected as to correct the position shift of the movable unit from the target position resulting from the difference between the control value-displacement characteristic at the ambient temperature and that at the reference temperature based on the ambient temperature. Thus, the movable unit 5 can be positioned at the target position even if the ambient temperature changes.

Technical features of the above drive device are summarized as follows.

(1) The above drive device includes a movable unit; a temperature detection unit for detecting an ambient temperature; a moving mechanism including a shape-memory alloy and adapted to move the movable unit using the shape-memory alloy; a setting unit for setting a control value using a control value-displacement characteristic at a predetermined reference temperature showing a relationship between a control value used to position the movable unit and a displacement of the movable unit; a drive unit for supplying drive power corresponding to the control value to the shape-memory alloy and causing the shape-memory alloy to expand or contract, thereby positioning the movable unit; and a correction unit for correcting the control value so as to correct a position shift of the movable unit from a target position resulting from a difference between a control value-displacement characteristic at the ambient temperature and a control value-displacement characteristic at the reference temperature based on the ambient temperature detected by the temperature detection unit.

According to this construction, since the control value is so corrected as to correct the position shift of the movable unit from the target position resulting from the difference between the control value-displacement characteristic at the ambient temperature and the control value-displacement characteristic at the reference temperature, the movable unit can be positioned at the target position even if the ambient temperature changes.

(2) The correction unit preferably corrects the control value so as to correct the position shift of the movable unit from the target position resulting from a difference in at least one of an inclination component and an offset component between the control value-displacement characteristic at the ambient temperature and the control value-displacement characteristic at the reference temperature.

According to this construction, the control value can be so corrected as to correct the position shift of the movable unit from the target position resulting from the difference in at least one of the inclination component and the offset component between the control value-displacement characteristic at the ambient temperature and the control value-displacement characteristic at the reference temperature.

(3) The correction unit preferably corrects the control value based on a product of a difference between the ambient temperature and the reference temperature and a predetermined temperature coefficient.

According to this construction, the movable unit can be accurately positioned since the control value is corrected based on the product of the difference between the ambient temperature and the reference temperature and the predetermined temperature coefficient.

(4) The temperature coefficient is preferably a value calculated based on a relationship between the ambient temperature detected by the temperature detection unit and a linear expansion coefficient of the moving mechanism.

According to this construction, the movable unit can be accurately positioned since the temperature coefficient is determined based on the relationship between the ambient temperature detected by the temperature detection unit and the linear expansion coefficient of the moving mechanism.

(5) Preferably, the setting unit sets the control value using a control value-displacement characteristic at the reference temperature common to apparatuses; and a value which corrects the position shift of the movable unit from the target position resulting from a difference between the control value-displacement characteristic common to apparatuses and an own control value-displacement characteristic is set as the temperature coefficient.

According to this construction, the movable unit can be accurately positioned since the temperature coefficient is so set as to correct the position shift of the movable unit from the target position resulting from the difference between the control value-displacement characteristic common to apparatuses and the own control value-displacement characteristic.

(6) The own control value-displacement characteristic is preferably obtained by measuring a control value at a predetermined first position and a control value at a second position different from the first position.

According to this construction, the own control value-displacement characteristic can be obtained by measuring two points since it is obtained by measuring the control value at the predetermined first position and the control value at the second position different from the first position.

(7) The temperature detection unit preferably detects the ambient temperature based on a resistance value of the shape-memory alloy. According to this construction, the ambient temperature can be detected even without disposing the temperature detection unit extra.

(8) The temperature detection unit preferably detects a resistance value when the shape-memory alloy actually starts being displaced and detects the ambient temperature based on a difference between the detected resistance value and a resistance value when the shape-memory alloy starts being displaced at the reference temperature.

According to this construction, the ambient temperature can be accurately detected using the shape-memory alloy since the resistance value when the shape-memory alloy starts being displaced is detected and the ambient temperature is detected based on the difference between the detected resistance value and the resistance value when the shape-memory alloy starts being displaced at the reference temperature.

(9) The drive unit preferably supplies the drive power in the form of a voltage, a current or a PWM signal. According to this construction, the drive power is supplied to the shape-memory alloy using a voltage, a current or a PWM signal.

The invention claimed is:

1. A drive device, comprising:
   a movable unit;
   a moving mechanism including a shape-memory alloy and adapted to move the movable unit using the shape-memory alloy;
   a setting unit for setting a control value using a control value-displacement characteristic at a predetermined reference temperature showing a relationship between a control value used to position the movable unit and a displacement of the movable unit;
   a drive unit for supplying drive power corresponding to the control value to the shape-memory alloy and causing the shape-memory alloy to expand or contract, thereby positioning the movable unit; and
   a correction unit for correcting the control value based on an ambient temperature so as to correct a position shift of the movable unit from a target position resulting from a difference between a control value-displacement characteristic at the ambient temperature and a control value-displacement characteristic at the reference temperature.

2. A drive device according to claim 1, wherein the correction unit corrects the control value so as to correct the position shift of the movable unit from the target position resulting from a difference in at least one of an inclination component and an offset component between the control value-displacement characteristic at the ambient temperature and the control value-displacement characteristic at the reference temperature.

3. A drive device according to claim 2, wherein the correction unit corrects the control value based on a product of a difference between the ambient temperature and the reference temperature and a predetermined temperature coefficient.

4. A drive device according to claim 3, wherein the temperature coefficient is a value calculated based on a relationship between the ambient temperature and a linear expansion coefficient of the moving mechanism.

5. A drive device according to claim 3, wherein:
the setting unit sets the control value using a control value-displacement characteristic at the reference temperature common to apparatuses; and
a value which corrects the position shift of the movable unit from the target position resulting from a difference between the control value-displacement characteristic common to apparatuses and an own control value-displacement characteristic is set as the temperature coefficient.

6. A drive device according to claim 5, wherein the own control value-displacement characteristic is obtained by measuring a control value at a predetermined first position and a control value at a second position different from the first position.

7. A drive device according to claim 1, wherein the temperature detection unit detects the ambient temperature based on a resistance value of the shape-memory alloy.

8. A drive device according to claim 7, wherein the temperature detection unit detects a resistance value when the shape-memory alloy actually starts being displaced and detects the ambient temperature based on a difference between the detected resistance value and a resistance value when the shape-memory alloy starts being displaced at the reference temperature.

9. A drive device according to claim 1, wherein the drive unit supplies the drive power in the form of a voltage, a current or a PWM signal.

10. A drive device according to claim 1, further comprising a temperature detection unit for detecting the ambient temperature.

11. A drive device according to claim 4, wherein:
the setting unit sets the control value using a control value-displacement characteristic at the reference temperature common to apparatuses; and
a value which corrects the position shift of the movable unit from the target position resulting from a difference between the control value-displacement characteristic common to apparatuses and an own control value-displacement characteristic is set as the temperature coefficient.

12. A drive device according to claim 11, wherein the own control value-displacement characteristic is obtained by measuring a control value at a predetermined first position and a control value at a second position different from the first position.

* * * * *